United States Patent [19]
Samples

[11] Patent Number: 5,729,002
[45] Date of Patent: Mar. 17, 1998

[54] ELECTRONIC BAR ENCODED GASOLINE SCANNER DEVICE

[76] Inventor: Geary Samples, 1827 Autumn Way, Lodi, Calif. 95242

[21] Appl. No.: 628,988

[22] Filed: Apr. 8, 1996

[51] Int. Cl.$^6$ .............. G06K 7/00; G06K 5/00; G06F 7/08
[52] U.S. Cl. .............. 235/462; 235/381; 235/380
[58] Field of Search .............. 235/462, 381, 235/380

[56] References Cited

U.S. PATENT DOCUMENTS

| | | | |
|---|---|---|---|
| 4,263,945 | 4/1981 | Van Ness | 141/98 |
| 4,345,146 | 8/1982 | Story et al. | 235/381 |
| 4,347,472 | 8/1982 | Lemelson | 320/2 |
| 4,469,149 | 9/1984 | Walkey et al. | 141/94 |
| 4,967,366 | 10/1990 | Kaehler | 364/479 |
| 5,157,319 | 10/1992 | Klonitz et al. | 320/2 |
| 5,202,617 | 4/1993 | Wer | 320/2 |
| 5,327,066 | 7/1994 | Smith | 235/381 |
| 5,359,522 | 10/1994 | Ryan | 364/465 |

*Primary Examiner*—Donald T. Hajec
*Assistant Examiner*—Douglas Rodriguez

[57] ABSTRACT

An electronic bar encoded gasoline scanner device comprised of a bar code imprinted within a top portion of a gasoline tank fill pipe. A laser scanner is secured to a gasoline dispensing nozzle. The laser scanner has wiring extending outwardly therefrom. The wiring serves to couple with an existing computer network. The laser scanner reads information on the bar code and relays a message to the existing computer network.

1 Claim, 3 Drawing Sheets

ELECTRONIC BAR ENCODED GASOLINE SCANNER DEVICE

BACKGROUND OF THE INVENTION

1. Field of the Invention

The present invention relates to an electronic bar encoded gasoline scanner device and more particularly pertains to automatically reading bank and credit cards within a gasoline tank with an electronic bar encoded gasoline scanner device.

2. Description of the Prior Art

The use of fueling devices for automobiles is known in the prior art. More specifically, fueling devices for automobiles heretofore devised and utilized for the purpose of automatically fueling automobiles are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,340,969 to Cox discloses a method and apparatus for approving transaction card based transactions.

U.S. Pat. No. 5,270,943 to Warn discloses a fuel pump control card.

U.S. Pat. No. Des. 289,778 to Thomas discloses the ornamental design for a cash and credit card actuated terminal for controlling the dispense of motor fuel or similar article.

U.S. Pat. No. 3,774,656 to Mayer discloses an automatic fuel dispensing nozzle.

U.S. Pat. No. 3,642,036 to Ginsburgh et al. discloses an automatic fueling system for automobiles.

U.S. Pat. No. 3,580,414 to Ginsburgh et al. discloses a fueling device for automobiles and the like.

U.S. Pat. No. 3,536,109 to Ginsburgh et al. discloses a control mechanism for automatic dispensing of motor fuel.

While these devices fulfill their respective, particular objective and requirements, the aforementioned patents do not describe an electronic bar encoded gasoline scanner device for automatically reading bank and credit cards within a gasoline tank.

In this respect, the electronic bar encoded gasoline scanner device according to the present invention substantially departs from the conventional concepts and designs of the prior art, and in doing so provides an apparatus primarily developed for the purpose of automatically reading bank and credit cards within a gasoline tank.

Therefore, it can be appreciated that there exists a continuing need for new and improved electronic bar encoded gasoline scanner device which can be used for automatically reading bank and credit cards within a gasoline tank. In this regard, the present invention substantially fulfills this need.

SUMMARY OF THE INVENTION

In the view of the foregoing disadvantages inherent in the known types of fueling devices for automobiles now present in the prior art, the present invention provides an improved electronic bar encoded gasoline scanner device. As such, the general purpose of the present invention, which will be described subsequently in greater detail, is to provide a new and improved electronic bar encoded gasoline scanner device and method which has all the advantages of the prior art and none of the disadvantages.

To attain this, the present invention essentially comprises a first cylindrical sleeve having an open first end and an open second end. The first cylindrical sleeve is adapted for securement within a top portion of a gasoline tank fill pipe. The open first end permits a gasoline nozzle passage through the first cylindrical sleeve. The open second end permits dispensed gasoline from the gasoline nozzle to enter into and fill the gasoline tank. The first cylindrical sleeve has an outer surface and an inner surface. The outer surface is adapted to be permanently sealed within the top portion of the gasoline fill pipe. The inner surface has a bar code imprinted thereon. A laser scanner is secured within a second cylindrical sleeve. The second cylindrical sleeve is adapted for securement to a gasoline dispensing nozzle. The laser scanner has wiring extending outwardly therefrom. The wiring serves to couple with an existing computer network.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved electronic bar encoded gasoline scanner device which has all the advantages of the prior art fueling devices for automobiles and none of the disadvantages.

It is another object of the present invention to provide a new and improved electronic bar encoded gasoline scanner device which may be easily and efficiently manufactured and marketed.

It is a further object of the present invention to provide a new and improved electronic bar encoded gasoline scanner device which is of durable and reliable construction.

An even further object of the present invention is to provide a new and improved electronic bar encoded gasoline scanner device which is susceptible of a low cost of manufacture with regard to both materials and labor, and which accordingly is then susceptible of low prices of sale to the consuming public, thereby making such an electronic bar encoded gasoline scanner device economically available to the buying public.

Still yet another object of the present invention is to provide a new and improved electronic bar encoded gasoline scanner device which provides in the apparatuses and methods of the prior art some of the advantages thereof, while simultaneously overcoming some of the disadvantages normally associated therewith.

Even still another object of the present invention is to provide a new and improved electronic bar encoded gasoline scanner device for automatically reading bank and credit cards within a gasoline tank.

Lastly, it is an object of the present invention to provide a new and improved electronic bar encoded gasoline scanner device comprised of a bar code imprinted within a top portion of a gasoline tank fill pipe. A laser scanner is secured to a gasoline dispensing nozzle. The laser scanner has wiring extending outwardly therefrom. The wiring serves to couple with an existing computer network. The laser scanner reads information on the bar code and relays a message to the existing computer network.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
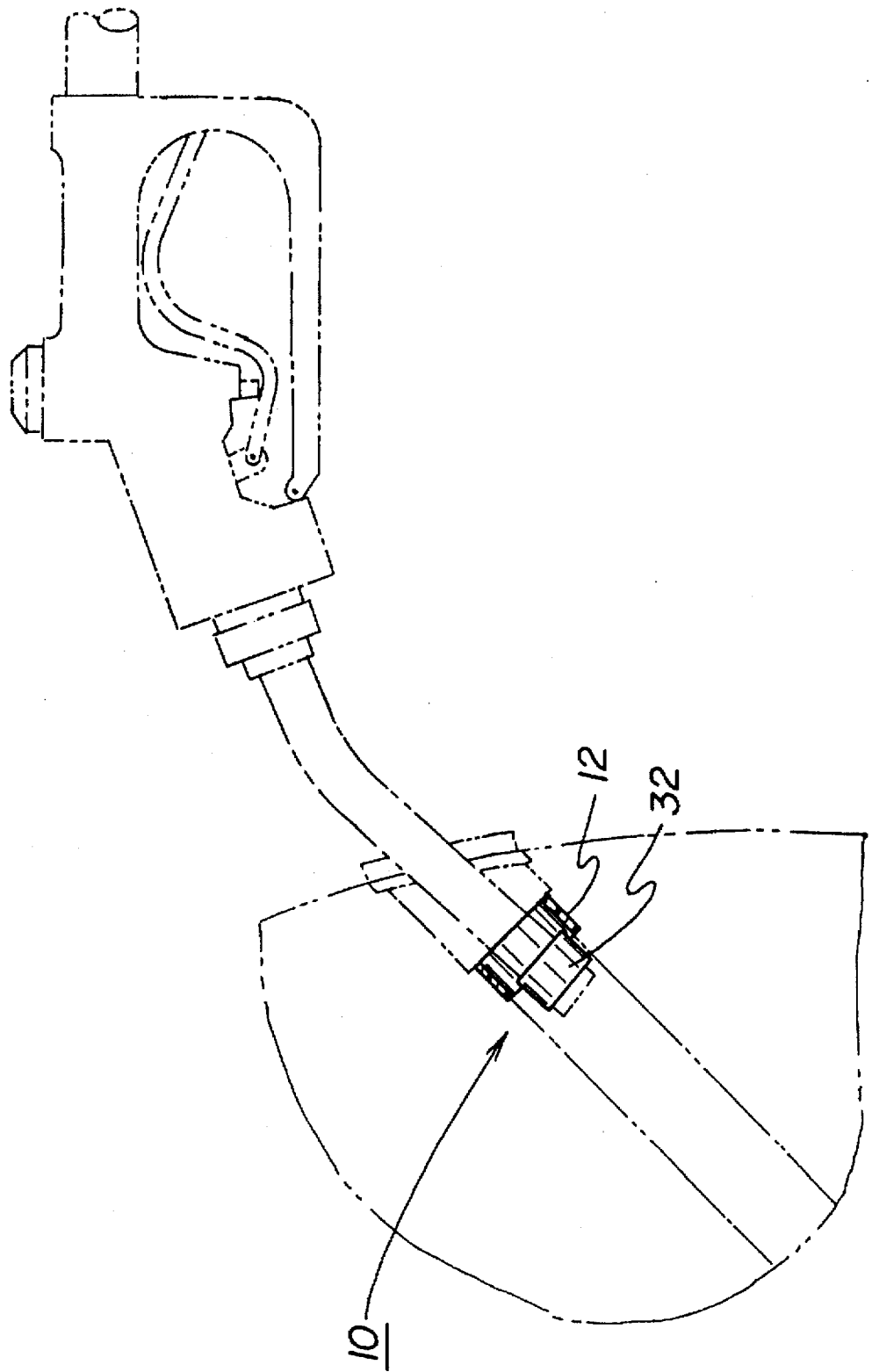
FIG. 1 is a perspective view of the preferred embodiment of the electronic bar encoded gasoline scanner device constructed in accordance with the principles of the present invention.
Figure 2:
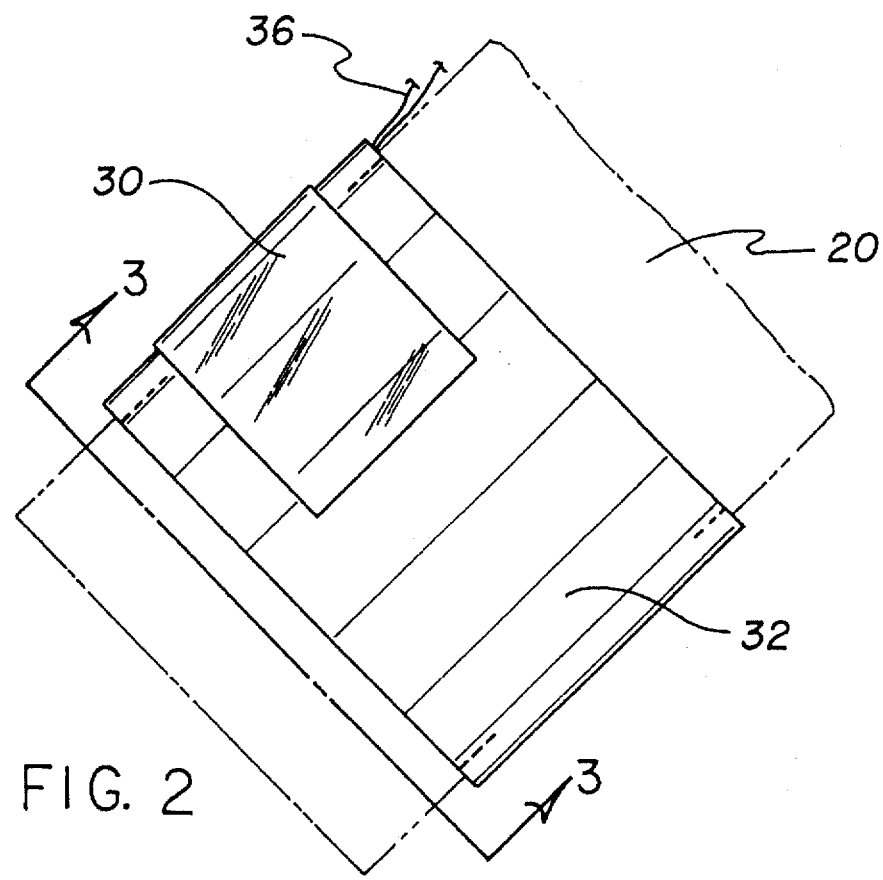
FIG. 2 is a perspective view of the scanner of the present invention coupled to a gasoline nozzle.
Figure 3:
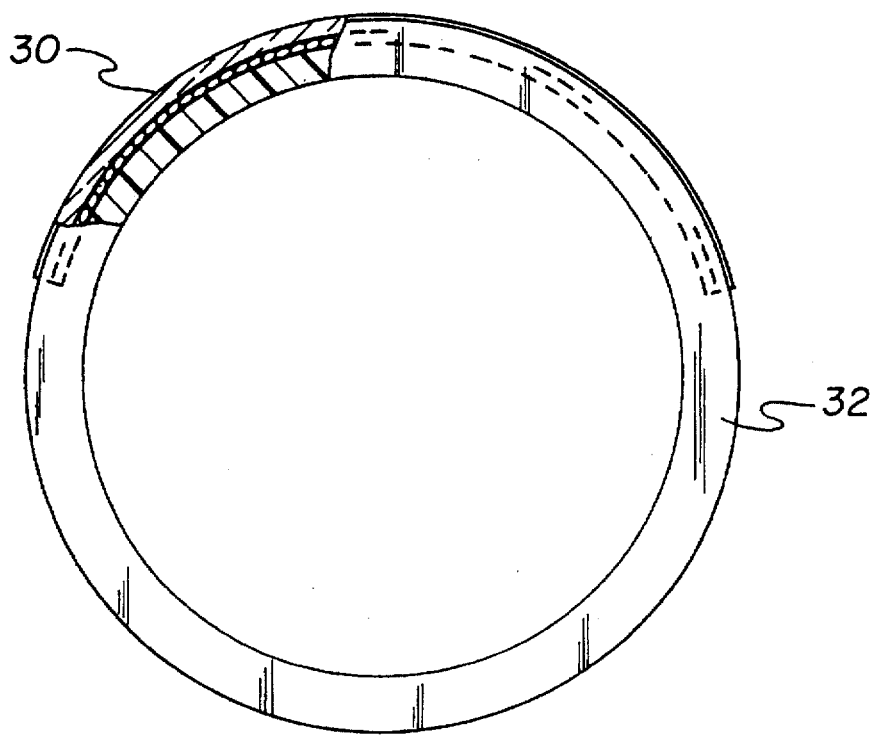
FIG. 3 is a cross-sectional view of the scanner as taken along line 3—3 of FIG. 2.
Figure 4:
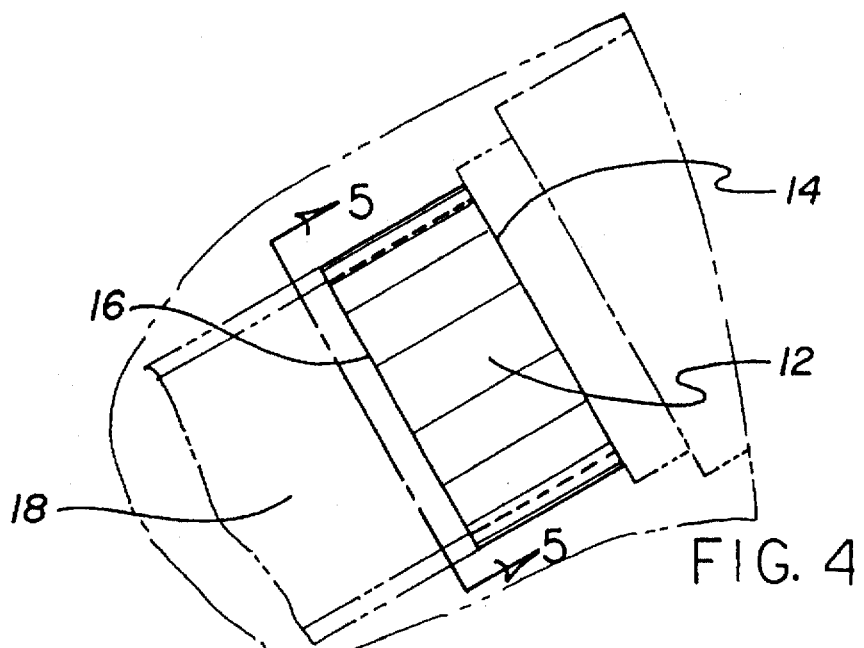
FIG. 4 is a perspective view of the cylindrical sleeve of the present invention secured within a gasoline tank.
Figure 5:
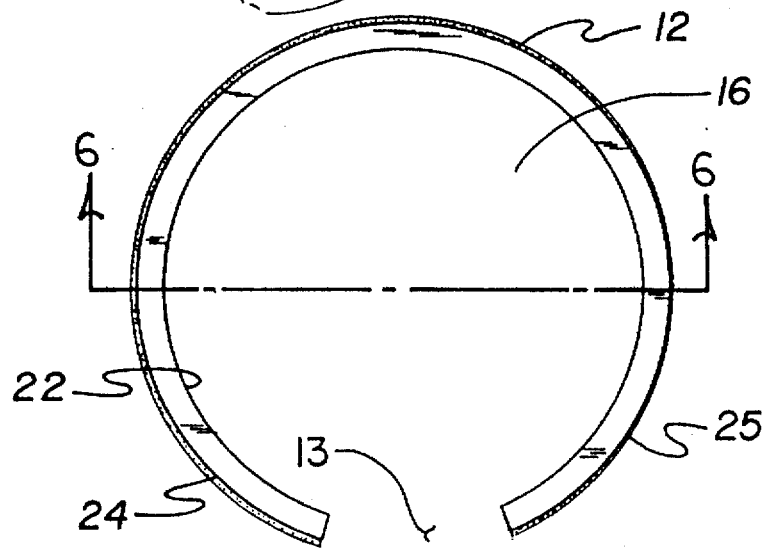
FIG. 5 is a cross-sectional view of the cylindrical sleeve as taken along line 5—5 of FIG. 4.
Figure 6:
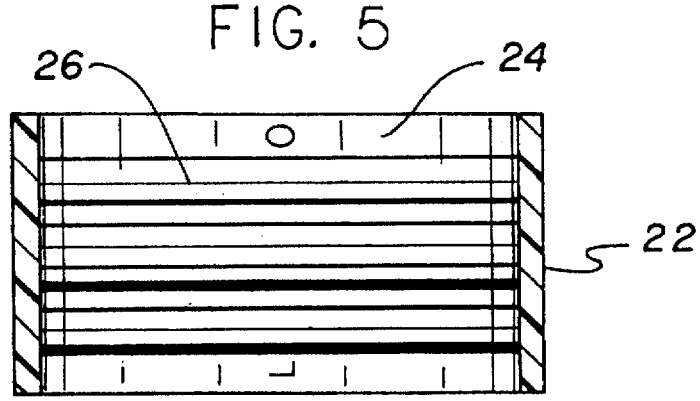
FIG. 6 is a cross-sectional view as taken along long 6—6 of FIG. 5 revealing the bar code on the cylindrical sleeve.

With reference now to the drawings, and in particular, to FIG. 1 thereof, the preferred embodiment of the new and improved electronic bar encoded gasoline scanner device embodying the principles and concepts of the present invention and generally designated by the reference number 10 will be described.

Specifically, it will be noted in the various Figures that the device relates to a new and improved electronic bar encoded gasoline scanner device for automatically reading bank and credit cards within a gasoline tank. In its broadest context, the device consists of a first cylindrical sleeve and a laser scanner. Such components are individually configured and correlated with respect to each other so as to attain the desired objective.

The first component of the device 10 is a first cylindrical sleeve 12. The first cylindrical sleeve 12 has an open first end 14 and an open second end 16. The first cylindrical sleeve 12 has a slit 13 formed between the first and second end allowing the circumference thereof to be temporarily reduced for insertion and securement within a top portion of a gasoline tank fill pipe 18. The open first end 14 permits a gasoline nozzle 20 passage through the first cylindrical sleeve 12. The open second end 16 permits dispensed gasoline from the gasoline nozzle 20 to enter into and fill the gasoline tank. The first cylindrical sleeve 12 has an outer surface 24 and an inner surface 22. The outer surface 24 is lined with a gasoline insoluble adhesive 25 for permanently maintaining an initial retrofitted position thereby precluding movement within the tank fill pipe 18. The inner surface 22 has a bar code 26 comprising parallel concentric lines imprinted around the circumference of the inner surface. The bar code 26 contains information pertaining to a car owners credit card or bank cards information.

The second and final component of the device 10 is a laser scanner 30. The laser scanner 30 is secured within a second cylindrical sleeve 32. The second cylindrical sleeve 32 is adapted for securement to a gasoline dispensing nozzle 20. The laser scanner 30 has wiring 36 extending outwardly therefrom. The wiring 36 serves to couple with an existing computer network. Once the gasoline dispensing nozzle 20 is inserted into the gasoline tank fill pipe 18, the laser scanner 30 will automatically read the bar code 26 therewithin despite the angle of rotation of the dispensing nozzle. The laser scanner 30 will then send a signal to the existing computer network to either bill the user's credit card or debit the user's bank card for the dollar amount of gasoline pumped into the gasoline tank.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. An electronic bar encoded gasoline scanner device for automatically reading bank and credit cards within a gasoline tank comprising, in combination:

a first cylindrical sleeve having an open first end and an open second end, the first cylindrical sleeve having a slit formed between the first and second end allowing the circumference thereof to be temporarily reduced for insertion and securement within a top portion of a gasoline tank fill pipe, the first cylindrical sleeve thus being adapted for securement within a top portion of a gasoline tank fill pipe, the open first end permitting a gasoline nozzle passage through the first cylindrical sleeve, the open second end permitting dispensed gasoline from the gasoline nozzle to enter into and fill the gasoline tank, the first cylindrical sleeve having an outer surface and an inner surface, the outer surface being adapted to be permanently sealed within the top portion of the gasoline fill pipe by means of a gasoline insoluble adhesive thereby precluding movement within the tank fill pipe, the inner surface having a bar code including parallel concentric lines imprinted thereon, wherein the bar code contains information pertaining to at least one of a credit card and bank card; and a laser scanner secured within a second cylindrical sleeve, the second cylindrical sleeve being adapted for securement to a gasoline dispensing nozzle, the laser scanner having wiring extending outwardly therefrom, the wiring serving to couple with an existing computer network;

whereby once the gasoline dispensing nozzle is inserted into the gasoline tank fill pipe, the laser scanner will automatically read the bar code therewithin despite the angle of rotation of the dispensing nozzle, the laser scanner will then send a signal to the existing computer network to either bill the at least one of the credit card and bank card for a dollar amount of gasoline pumped into the gasoline tank.

\* \* \* \* \*